June 9, 1953 W. H. HANNAHS 2,641,675
PRINTED ELECTRICAL CONDUCTOR
Filed Jan. 17, 1950
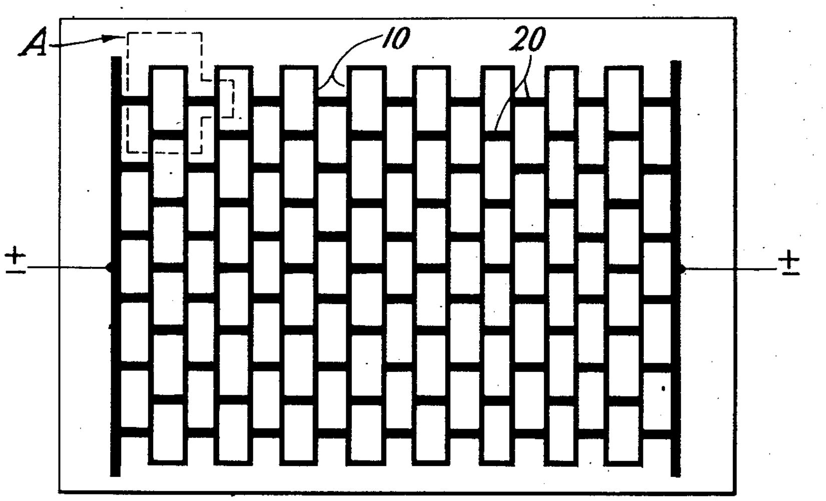
Fig.1
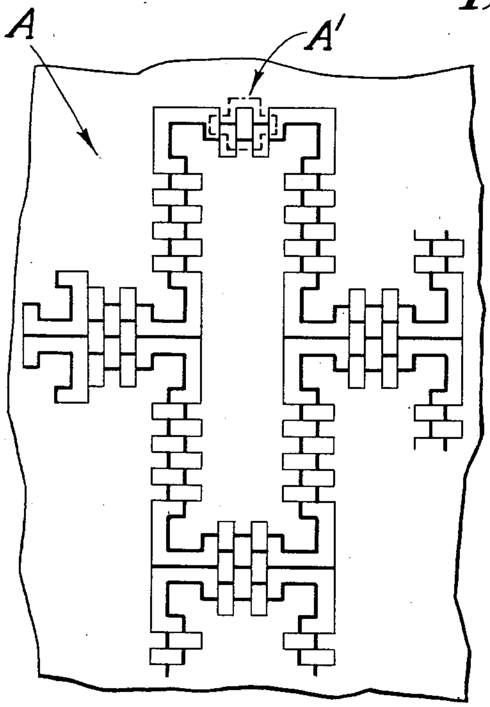
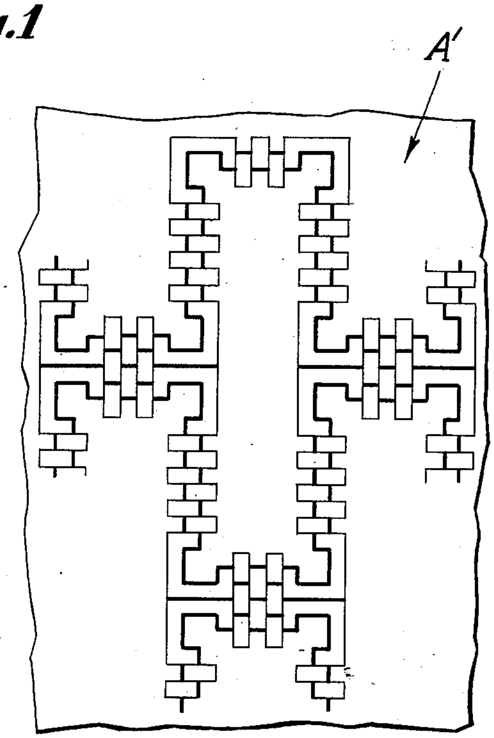
Fig.2 Fig.3
INVENTOR
WILSON H. HANNAHS
BY F. Kumpf
ATTORNEY Patented June 9, 1953 2,641,675

UNITED STATES PATENT OFFICE 2,641,675

PRINTED ELECTRICAL CONDUCTOR

Wilson H. Hannahs, Westbury, N. Y., assignor to Sylvania Electric Products Inc., a corporation of Massachusetts Application January 17, 1950, Serial No. 138,983

2 Claims. (Cl. 219—19)

This invention relates to electrical conductors and to the method for making the same. More particularly it relates to an improvement in electrical circuits, resistances, inductors, heating elements and conductors, particularly those in the form known to the electronics industry as printed circuits.

In this form the component or circuit is characteristically constructed of a thin metallic or non-metallic film-like conducting member of the order of thickness of .001 inch or less which is closely bonded to a non-conductor in the manner known to the decorating trade as "metallized." Such metallized circuit components are frequently made by stenciling or printing conducting inks or paints upon glass, ceramics, plastic, treated papers and the like. They are also made of thin metal foils fashioned to shape and adhered to the non-conducting member.

Components or circuits of this type which have been made in accordance with prior art practice inherently possess certain disadvantages, chief of which is their sensitivity to uneven current density and uneven heating (dissipation) which causes rapid deterioration and burn out. This latter disadvantage is often aggravated by the inherent unevenness in distribution of the conducting film when printing or like graphic arts processes are used for reproducing the circuit pattern. Furthermore the fact that a slight accidental abrasion may sever the conducting film and render the whole component or circuit inoperative is a further disadvantage.

As a result of these limitations, printed circuit components of the prior art are in practice restricted to operation at wattages and temperatures considerably below the full capabilities of these structures in order to get a reasonable operating life from them. Accordingly, it is well recognized that printed circuits, heaters and resistors constructed in accordance with the prior art are normally limited to approximately 150° C. thus making such resistors incapable of use in appliances as for example a toaster for toasting bread in the conventional manner as well as incapable of use in components where long stability at high heat dissipation is necessary as is the case with electronic resistors.

It is an object of this invention to improve conductor and resistor design and make them adaptable for use at temperatures in the neighborhood of 400° C. and above as well as for electronic resistors which will exhibit long stability at high heat dissipation.

It is a further object of this invention to provide printed circuit components whose conducting areas have uniform current density over the entire area and which will not be prone to form hot spots with the resultant accelerated deterioration and burn out.

It is a still further object of this invention to provide printed circuit components which are resistant to mechanical abrasions.

It has been found that these objects and other advantages can be obtained in circuits and circuit components of the thin film type if the film like conductor consists of a group of parallel paths frequently connected at equipotential points and all having equal current densities. In the accompanying drawings which illustrate preferred forms of printed circuits of this invention, Fig. 1 is a plan view of a resistor in which the lines represent film conductors.

Fig. 2 is an enlarged view of a portion A of Fig. 1 showing the application of the principle of this invention to a segment of the resistor shown in Fig. 1.

Fig. 3 is an enlarged view of a portion A' of Fig. 2 showing the reapplication of the principle of this invention to a segment of the component shown in Fig. 2.

In each of the preferred forms illustrated, it is important to note that not only do the conductive portions consist of interconnected parallel paths which are tortuous and interconnected perpendicular to the gross direction of the current (over all input and output) but these paths are twice the widths of those paths which are parallel to the gross direction of the current so that the current density in all portions of the mesh is equal. In preferred forms of the conductors of a circuit or of a circuit component which has been designed in accordance with this invention the conductors are formed of a film of colloidal particles of gold, silver, or other noble metal or noble metal alloys closely sintered and consolidated into a soft matrix enclosing substantially larger and harder metal particles of a base metal such as nickel, chromium, iron, cobalt or the alloys of these elements in such corrosion resistant compositions as stainless steel, Nichrome etc. The conductors are firmly attached or fused to a non-conducting support such as glass, such as boro-silicate glass, 96% silica glass, or fused silica, or Mycalex, ceramics, or the like.

In Fig. 1 is shown a design for a preferred form of resistor which is made up of twelve parallel tortuous equipotentially interconnected current paths. Such a resistor which may be constructed by silk screening colloidal metal suspensions upon Pyrex glass and then sintering to consolidate the metal may well serve as a room heater or the bottom of a cooking vessel or for example the heating element of a toaster capable of toasting bread. It will be noted that the conductors 10 parallel to the gross direction of the current are one half the width of those perpendicular to the gross direction of the current as at 20. This provides a mesh in which all portions of the conductor have equal current density.

Fig. 2 shows an enlarged view of a section A of Fig. 1 if the principles of this invention are applied again to the design of the conductor there shown so that each tortuous equipotentially interconnected current path is itself made up of a group of tortuous equipotentially interconnected current paths having a uniform current density. This same principle could of course be carried a step further as is illustrated in Fig. 3 wherein the individual current paths have again been broken up into tortuous equipotentially interconnected current paths having a uniform current density. The only limitation to the reapplication of this principle again and again is that limitation resultant or depending upon the ability to print or otherwise apply a fine line.

These designs may be applied in accordance with any of the well known techniques for example in a particular procedure the design may be drawn in India ink and photographed with a reduction of several times in size to improve detail. A positive transparency may then be made from the photographic negative and the design on this positive is photographically printed upon a silk screen which has been photosensitized with dichromates in gelatin or other preparation well known in the silk screening art. Dark lines in the original ink drawing which are transparent in the negative are opaque in the transparent positive and prevent the light used in the photographic printing from hardening the photosenstized gelatin on the screen. These unhardened portions of the gelatin representing the pattern transferred to the screen are now washed out with water leaving the opening in the mesh clear in a pattern corresponding to the original ink drawings excepting in size. A quantity of the pasty mixture of the silk screening paint is then placed along one edge of the silk screen pattern and with a squeegee is spread on the screen and forced through the openings onto the glass or ceramic base placed underneath the screen. Although ordinary ceramic decorating paints made of colloidal silver or gold or easily decomposable compounds of noble metals and formulations well known to the trade may be used to produce some printed circuits and some components in accordance with the procedure outlined above, it has been found that particularly favorable circuits result when the special silk screening ink described in this invention is used. A typical composition is as follows, 28.7% fine gold powder, 4.4% lead metaborate, 16.0% Copiaba balsam, 0.9% rosin, and 50.0% stainless steel (304) powder. The percentage of stainless steel may be varied from 0 on up to about 75%. The preferred composition contains about 50%.

After screening the pattern upon the non-conducting base the assembly is fired at approximately 600° C. for twenty minutes to consolidate the noble metal matrix into a relatively pure noble conductor intimately bonded to the non-conducting base. When printed circuits are made in accordance with the above disclosure, it is readily apparent that since the conducting path is divided any accidental abrasion such as might affect the conductivity of a minor path will affect only a small portion of the total current carrying capacity rather than rendering the device completely inoperative. Should one or several of the parallel paths be cut the interconnection feature serves to divert and diffuse the blocked currents around the minor discontinuity so as to prevent overloading of the conductors adjacent to the break. By this same action thin spots or inequalities in thickness of the thin film which frequently results from uneven printing pressure, dust particles or other faults inherent to graphic arts processes are likewise prevented from overloading the adjacent conductors and thus alleviating minor defects. The cross tying feature between parallel inductors also provides dimensional stability to the circuits when this is a free standing metal sheet and also either to the die or to the counter-die which is used to cut the thin conducting sheet or either to the stencil or to the counter-stencil or the pattern necessary to produce the circuit.

When the components or circuits are constructed with the thin metal film designed as described and are comprised of hard particles of material such as stainless steel imbedded in a matrix of soft metal they are also very resistant to mechanical abrasion as well as resistant to oxidation and corrosion because both the noble metal and the base metal composition used intrinsically have such resistance. At the same time a large proportion of the base metal in the composition provides a low cost material which can be applied by furnace sintering methods for which previously only high cost noble metal compositions could be used. Furthermore the uses of these compositions also have the advantage that high frequency electrical conduction is maintained where necessary at or near the surface, by reason of the fact that the enclosing matrices of gold, silver or such noble metal which have and retain good radio frequency conduction. Since little or none of the base metal is exposed it does not interfere with radio frequency conduction.

When the design principle set forth is applied several times successively it is possible to produce a high resistance in small areas whereas the use of noble metal and corrosion resistant base metal in the application of the invention permits operation at temperatures several times that of those normally obtainable in the art. Furthermore as may be seen from the illustrations a very large amount of open area not covered by the conductor is provided when the printing is done on a transparent base. This may be of particular advantage to permit inspection of cooking and toasting operations through heaters constructed in accordance with the invention. The use of substantially pure noble metals for the matrix in enclosing the hard base metal particles furthermore provides a yieldable conductor which is not readily fractured, by a difference in thermo-expansion and contraction between the ceramic non-conductors and the metal conductors printed upon it.

While the above description and the drawings submitted herewith disclose preferred and practical embodiments of the printed circuit components of the invention it will be understood that these are by way of illustration and are not to be construed as limiting the scope of the invention.

What is claimed is:

1. A printed circuit which includes a base, terminal points for the attachment of electronic circuit elements and film-like conducting paths between said terminal points, said conducting paths consisting of a group of parallel paths frequently connected at equipotential points and having equal current densities.

2. A printed circuit which includes a base, terminal points for the attachment of electron circuit elements and a film-like conductor between said terminal points, said film-like conductor consisting of interconnected parallel tortuous paths interconnected substantially perpendicular to the gross direction of the current, the paths perpendicular to the gross direction of the current being substantially twice the width of the paths parallel to the gross direction of the current.

WILSON H. HANNAHS.

References Cited in the file of this patent

UNITED STATES PATENTS

| Number | Name | Date |
|---|---|---|
| 636,203 | Helberger | Oct. 31, 1899 |
| 1,963,554 | McDill | June 19, 1934 |
| 2,111,506 | Edwards et al. | Mar. 15, 1938 |
| 2,165,970 | Jaspers | July 11, 1939 |
| 2,273,941 | Dorn | Feb. 24, 1942 |
| 2,389,018 | Ballard | Nov. 13, 1945 |
| 2,441,960 | Eisler | May 25, 1948 |
| 2,447,541 | Sabee | Aug. 24, 1948 |

FOREIGN PATENTS

| Number | Country | Date |
|---|---|---|
| 29,622 | England | Mar. 25, 1915 |
| 634,073 | Germany | Aug. 20, 1936 |